United States Patent [19]
Shinal

[11] 3,806,704
[45] Apr. 23, 1974

[54] IDENTIFICATION SYSTEM

[76] Inventor: Thomas J. Shinal, 2951 Maple Dr., Fairfax, Va. 22030

[22] Filed: Aug. 2, 1971

[21] Appl. No.: 168,265

[52] U.S. Cl. 235/61.7 B, 340/149 A, 340/146.3 SY
[51] Int. Cl. ............................................. G06k 5/00
[58] Field of Search . 235/61.7 B, 61.11 A, 61.11 D, 235/61.11 E, 61.11 R; 178/18, 19, 20; 340/347 AD, 146.3 SY, 146.3 K, 149 A; 73/432; 194/4 R

[56] References Cited
UNITED STATES PATENTS

| | | | |
|---|---|---|---|
| 3,113,461 | 12/1963 | Peters | 340/146.3 SY |
| 3,569,619 | 3/1971 | Simjian | 340/149 A |
| 3,579,186 | 5/1971 | Johnson | 235/61.7 B X |
| 3,308,253 | 3/1967 | Krakinowski | 178/18 X |
| 3,522,664 | 8/1970 | Lambright et al. | 178/18 X |
| 3,624,619 | 11/1971 | Ambrosio | 178/18 X |
| 3,563,097 | 2/1971 | Roggenstein et al. | 73/432 |
| 3,134,099 | 5/1964 | Woo | 340/347 AD |
| 3,469,240 | 9/1969 | Ryden | 235/61.7 B X |

*Primary Examiner*—Thomas J. Sloyan
*Attorney, Agent, or Firm*—William Grobman

[57] ABSTRACT

This invention comprises a system for identifying persons by means of checks, badges, tokens, or the like. The system includes apparatus for analyzing the signature of the person to be identified to determine certain characteristics which can be digitally expressed; an encoder for encoding the digital information representing the signature; a card embosser for recording that digital encoding onto a check, token, badge, or the like; said token etc., which remains in the possession of the person to be identified; and apparatus for providing a check station at each location where the person is to be identified. The check station includes a surface upon which the person's signature is written, an encoding system, and a comparator for comparing the signature information recorded on the card, token, badge or the like and that produced at the station. The system can also be used to determine the authenticity of the badge, token, card or the like.

9 Claims, 20 Drawing Figures

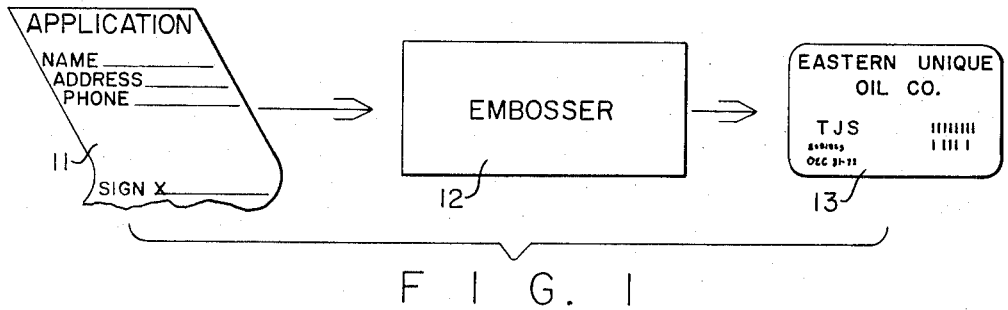
FIG. 1
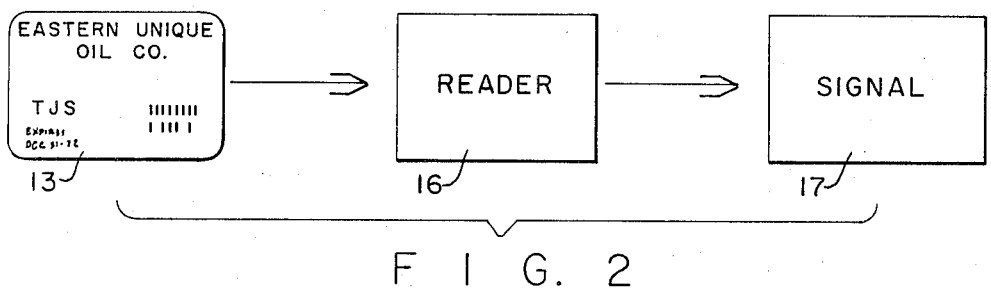
FIG. 2
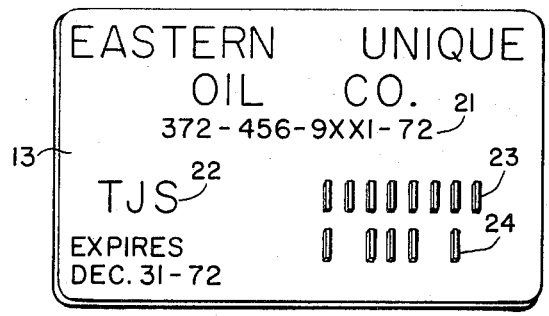
FIG. 3
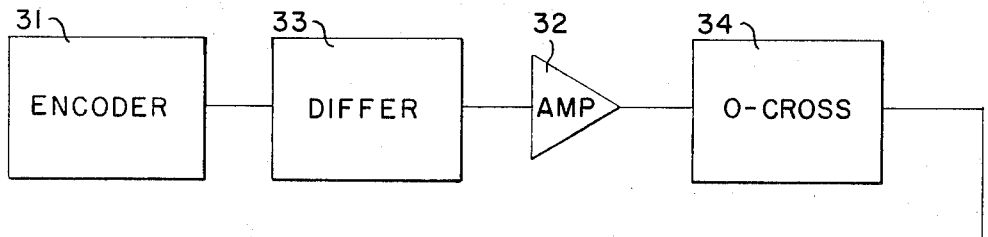
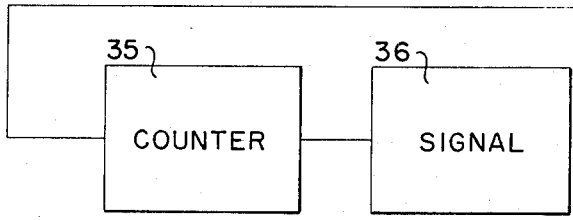
FIG. 4
INVENTOR.
THOMAS J. SHINAL

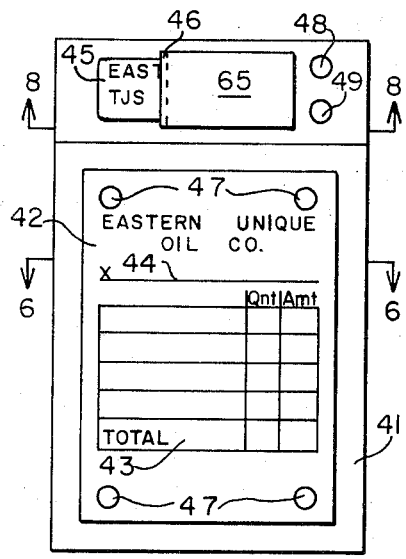
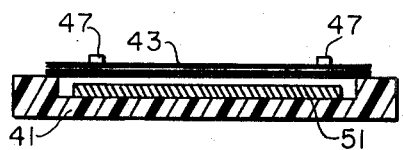
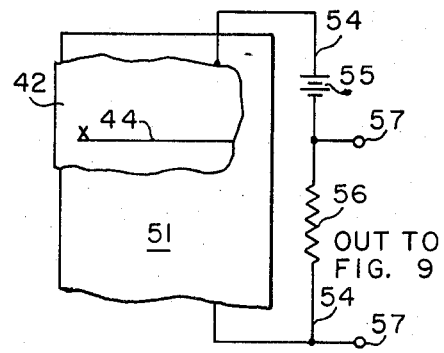
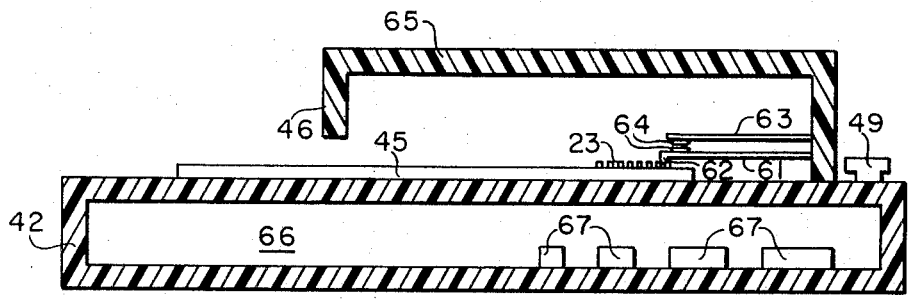
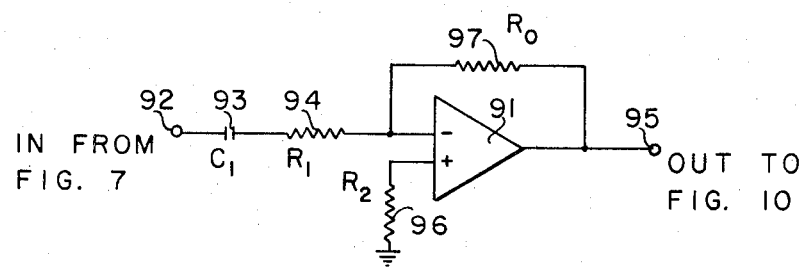
INVENTOR.
THOMAS J. SHINAL

*INVENTOR.*
THOMAS J. SHINAL
BY
*William Crolman*

INVENTOR.
THOMAS J. SHINAL
BY
William Grobman

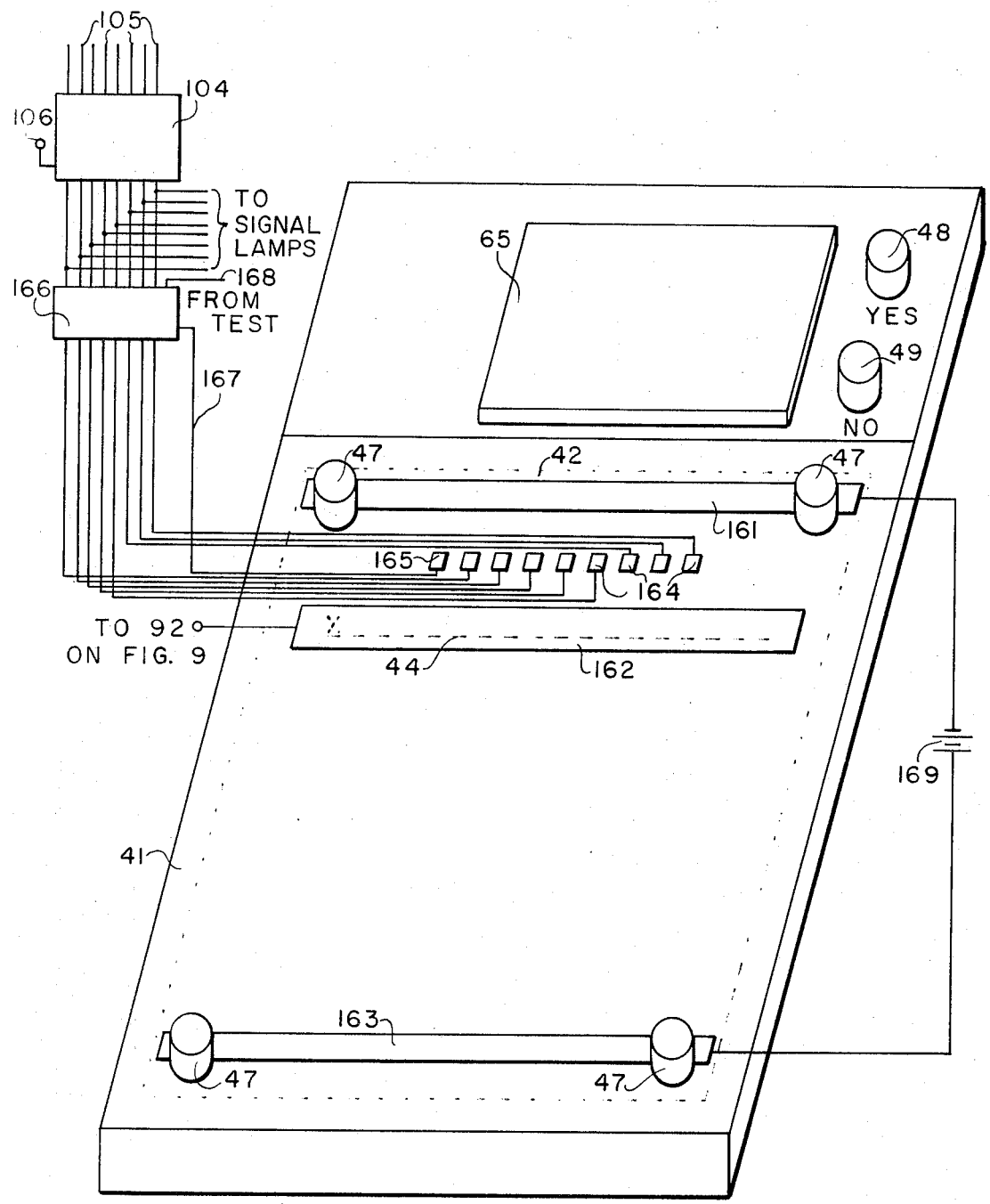
F I G. 19

IDENTIFICATION SYSTEM

This invention relates to identification systems, and more particularly to systems which include a personal identification means issued to each person to be identified.

Personal identification systems are not new. For at least as long as letters of credit, personal bank checks, and similar devices have been used, it has been necessary for an individual to identify himself as the person mentioned on the paper. This situation has become even more acute as the present penchant for credit cards, charge plates, and other money substitutes has grown. When transportation was difficult and communities were small, few special needs for personal identification were necessary. Today, a family can move across the country or across the oceans with ease and rapidity, and individuals travel extensively on short notice and with few preparations. The credit card, which is really a specialized letter of credit, has helped produce this mobile revolution, and this mobile revolution has helped injure those who issue the credit cards. Because of the mobility of individuals, stolen credit cards can be used by other than those to whom they were issued as a means to steal large amounts of money, goods, and services before the loss of the card is realized. In order to prevent this type of misuse, several means have been devised and tested by the issuing organizations.

One such means is the inclusion on the face of the card of a photograph of the person to whom the card is issued. This photograph is often in color and occupies about one-third to one-half of the card area. However, it has been found that most people to whom a credit card is presented do not really take the time to compare the photograph with the person presenting it. In addition, individuals lose their hair, or change its color; they lose weight, or they gain weight—they change their appearances quite drastically in a comparatively short time. Thus, the purpose of the photograph on the card is readily defeated, and that form of security check is practically worthless.

Another means for trying positively to identify the person offering a credit card (in this specification "credit card" is used as a generic term covering all such forms of checks, tokens, badges, etc.,) is by comparing the person's signature by eye with that which is written on the card. But it has been found that most signatures written on the cards do not long remain there. They are soon rubbed off in whole or in part, or are otherwise obliterated. In addition, few clerks take the time to compare signatures carefully, so that any signature remotely like that on the card passes muster.

In addition to the above means, it has been suggested that individual cards contain recorded voice prints, or fingerprints, or other identifying marks of the person to whom it is issued. Again, the success of such identifying marks depends upon the care and the interest of the person to whom the card is offered for goods or services.

As an incentive to their clerks to observe more closely the credit cards and the persons offering them for goods and services, some oil companies have offered their clerks a monetary incentive award for each improper card they retrieve and destroy. However, even the incentive awards do little to curb the misuse of the cards; and as that use becomes more widespread, the misuse will also become more widespread.

The industry now requires a simple, inexpensive automatic device which will positively identify the person and the card as a unique couple. This device must be portable, easy to use, and relatively immune to changing habits of persons of widely differing skill.

It is an object of this invention to provide a new and improved identification system.

It is another object of this invention to provide a new and improved identification system which is inexpensive and simple to use.

It is a further object of this invention to provide a new and improved identification system which will provide an individual with his personal identification to be carried with him.

It is still another object of this invention to provide an identification system which will permit an individual to identify himself positively by his signature.

It is still a further object of this invention to provide a new and improved identification system which will positively identify individuals separately and individually at any location which includes a simple, inexpensive identification device.

Other objects and advantages of this invention will become more apparent as the following description proceeds, which description should be considered together with the accompanying drawings, in which:

FIG. 1 is a simple schematic showing of the encoding portion of the system;

FIG. 2 is a simple schematic showing of the identification portion of the system;

FIG. 3 is a perspective view of a typical credit card which can be used in the system of this invention;

FIG. 4 is a block diagram of the identification portion of the system;

FIG. 5 is a plan view of a sales slip and identifier which can be used in this invention;

FIG. 6 is a sectional view taken along line 6—6 of the apparatus shown in FIG. 5;

FIG. 7 is a plan view of a portion of the apparatus of FIG. 5;

FIG. 8 is a sectional view taken along line 8—8 of FIG. 5;

FIG. 9 is a schematic circuit diagram of a typical differentiator used in the system of this invention;

Figure 17:
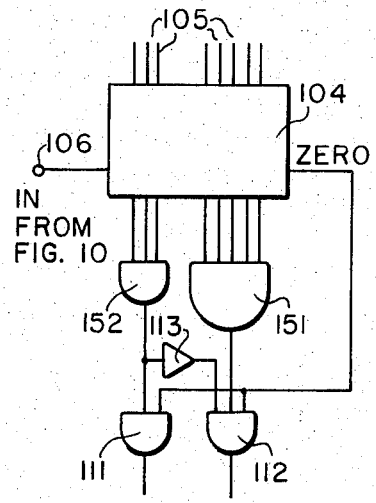
Figure 20:
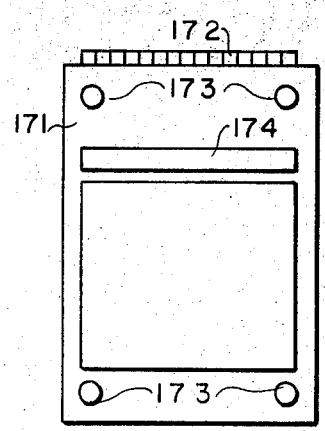
Figure 18:
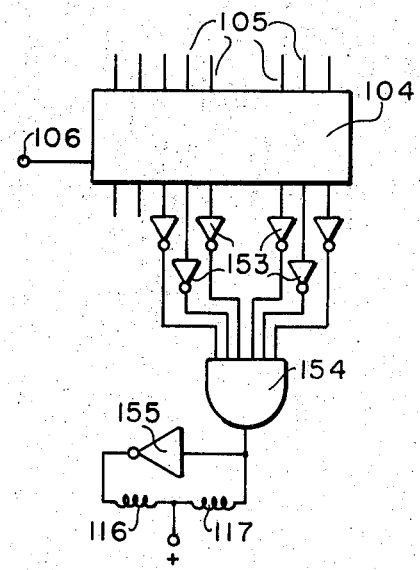

FIGS. 13, 14, 15, and 16 are sectional views of other forms of signature readers which may be used in the system of this invention;

FIGS. 17 and 18 are block diagrams of alternative forms of comparators which may be used in the system of this invention;

FIG. 19 is a perspective view of an alternative remote station which may be used in the system of this invention; and FIG. 20 is a plan view of a hinged cover for use with the remote station of FIG. 19.

Referring now to the drawings in detail, and more particularly to FIG. 1; the reference character 11 designates an application for credit or the like. For this discussion it will be assumed that 11 is an application for a credit card and that evidence of granting the application is the presentation of a personal credit card. The information from the application 11 is abstracted, and some of that information is applied to an embosser for transfer to a credit card 13 which is produced thereby.

The credit card 13 is used in the system of this invention as shown in FIG. 2, wherein when the card carrier requests goods and services, the credit card 13 is applied to a card reader 16, the card carrier signs the sales slip, and a signal 17 is produced. The signal 17 indicates whether or not the combination of the card 13 and the signature which is obtained at the reader comprise a valid combination.

Since the information carried by the card 13 itself is important to the operation of this invention, such a card is shown in schematic form in FIG. 3. The card 13 appears similar to many such cards and contains the name 19 of the organization extending credit; an account number 21, which may be in the form of Arabic numerals or which may be encoded, or both; the initials of the card bearer; and the two rows 23 and 24 of embossed digital information. It is contemplated that the card 13, in accordance with this invention, will bear neither the full name of the card holder nor a facsimile of his signature. The initials 22 are provided to identify the card carrier in those situations where a single clerk may have the cards of several holders at one time. It is contemplated that initials alone will be sufficient identification, since the circumstances in which such card confusion would occur would be rather remote, and the chances of two card holders with the same initials being in the same confusing situation at the same place and time is almost zero. The name 19 of the issuing organization may be printed on the card and then coated, or it may be embossed thereon, or it may be applied by any suitable means and in any suitable manner. This is also true of the initials 22 and the account number 21. To produce a more versatile card 13, the account number may appear in encoded form, or it may appear—as shown—in numerals, or both. The decoration which appears on the card and which identifies the card 13 at a glance as the property of one or another issuing organization may be the decoration presently being used and may be applied to the card 13 in any form and manner. The row of embossed digital information 24 provides the card 13 with an encoded value for the signature of the card holder. The row of embossed digital information 23 is a row of clock digits.

In explanation of FIGS. 1, 2, and 3, it must be indicated that the application 11 for a credit card 13 is important for the proper operation of the system of this invention. The application 11 is signed by the individual applying for credit. The signature as it appears is analyzed, and a numerical value is assigned to that signature. This numerical value is encoded, and is applied to the card 13 in the form of the raised digits 24. In the example shown and used throughout this specification, a binary number of eight binary digits is used. This provides 256 combinations of digits 24 which can appear on the card 13. Although this may seem to be a small number of combinations, when used together with a signature, the combination provides an extremely secure system. In one system for analyzing the signature of any individual, the number of points at which the signature changes direction is used. In any signature, the writer will move the writing instrument upwardly to a peak, then move it downwardly until it reaches a low point, and then proceed upwardly again. This continues while, at the same time, the writing instrument is moving from left to right across the paper so that the slope and general direction of the drawn line at any time are a combination of movements of the instrument. Each point at which the instrument changes its vertical direction and moves in another direction—from upwardly to downwardly, or from downwardly to upwardly—is counted, and the total comprises the number which is encoded and embossed on the card 13 at 24. Although the number which is encoded on the card 13 at 24 is not unique; that is, a number of card holders will, undoubtedly, have the same number, the signature which is written at the reader 16 in FIG. 2, and is electronically analyzed, must match the number recorded at 24 on the card 13. The reader 16 makes a comparison and signals at 17 that the combination is or is not valid. Of course, for this example, a simply binary representation of the number is used. However, to avoid ready development of signatures which would match the number on stolen cards, the number may be encoded in any arbitrary code. The codes may vary from one issuer of cards to another. And any card issuer may change his code when he desires. The simplest such code is arbitrarily to add a fixed number to the signature value and emboss the total on the card. In addition, the expiration data shown on the card 13 below the initials 22 can be used to select one code or another in a reader 16 so that more than one code can be used at any time. If desired, the number of binary bits or digits 24 used may be increased or decreased to meet individual situations.

The system of the reader 16 is shown in block form in FIG. 4 and comprises an encoder 31 which encodes the signature produced at the reader. The output of the encoder 31 is applied to the input of a differentiator 33 which produces the first derivative of the encoded information from the encoder 31. The output from the differentiator 33 is applied through an amplifier 32 to the input of a crossover detection network 34 which detects each time the differentiated signal crosses the zero potential line. The output from the crossover detector 34 is a train of pulses which are counted by the counter 35 and which are compared with the value read from the card 13. The comparison produced by the counter 35 produces an output which activates the signal device 36 in the appropriate situation.

One form of the encoder 31 is shown in some detail in FIGS. 5, 6, and 7. It comprises a base 41 which can be formed as a holder to support sales slips 42 on posts 47 adapted to protrude through perforations in the sales slips 42. The sales slips 42 comprise portions or areas in which appear the name of the organization extending credit, a place for a signature 44, and a portion 43 in which the purchases or services provided can be listed. The base 41 is hollowed slightly beneath the sales slips 42, and a conductive surface 51 (FIG. 6) is contained in the hollow. The sales slips 42 are multilayered and are formed so that the bottom of the lowest layer is made of a conductive material having a fixed and definite electrical resistance. As shown in FIG. 7, a source of electrical energy, shown by battery 55, is connected by wires 54 at one end to one end of the bottom sheet 42 of the sales slip and at the other end through a load resistor 56 to a conductive surface 51. As shown in FIG. 6, the bottom sheet 42 of the sales slip is maintained separated from the conductive surface 51 by the posts 47. The output from the encoder is taken across the load resistor 56 by the terminals 57.

When someone appears with a credit card 45, it is inserted into the slot 46 where the information contained thereon is read. Then he signs his name on the line 44, indicated with an X. As he writes his signature, the pressure of the writing causes the sales slips 42 to be deflected downwardly so that the bottom sheet touches the conductive surface 51. The conductive surface 52 serves to short-circuit a varying portion of the bottom sheet of the sale slips 42, as the writing instrument moves over different portions of the sales slip 42 changing the resistance of the circuit to the flow of current from the battery 55. As the point of the pen or pencil moves toward the upper edge of the sales slip 42, the point at which the sales slip 42 touches the surface 51 changes, the resistance of the circuit decreases and the current flowing through the load resistor 56 increases. As the pen or pencil moves toward the bottom edge of the slip 42, the resistance increases, decreasing the flow of current through the load resistor 56. This modulation of the current from the battery 55 produces a voltage drop across the load resistor 56 which varies in time in the same manner as the pen or pencil. The varying potential is taken from the system by the terminals 57, and is applied to the amplifier 32 and the differentiator 33 shown in FIG. 4.

The apparatus for reading the card 45 is shown in FIG. 8, which is a sectional view of the device of FIG. 5 taken along the line 8—8. The board 42 is shown having a hollow interior in which are contained the electronic devices and other components 67 of the system. The top portion of the board 42 above the sales slip 42 has an upper housing 65 mounted thereon. A slot 46 is provided for the entrance of the card 45 which is shown in position in FIG. 8. Contained within the housing 65 is a plurality of switches 64, only one of which is shown. The switch which is shown comprises an arm 61 of resilient material, such as a metal spring material, with a wedge shaped cam follower 62 at one end and with the other end of the arm 61 attached to the side wall of the housing 65. A second arm 63 is relatively rigid and has one end also attached to the side wall of the housing 65. The two arms 61 and 63 have individual contacts 64 which are positioned in complementary relation to one another. A pair of wires connect the two arms 61 and 63 (or the two contacts 64, if the arms are electrically non-conductive) to electrical components 67 contained within the cavity 66.

As the card 45 is inserted into the opening 46, the raised digits 24 encounter the cam follower 62, forcing the arm 61 to retreat upwardly as the cam follower 62 passes over each of the digits 24. As each digit passes the follower 62, the arm 61 returns to its normal position. When the arm 61 is forced upwardly, the two contacts 64 are closed, applying an electrical pulse to the appropriate component 67 in the cavity 66. At least two such switches are contained in the housing 65. They are positioned so that as the card 45 is inserted, one of the switches responds to the clock digits 23 and the other responds to the signature information digits 24. In this manner, the speed with which the card is inserted is immaterial to the operation of the device, for the use of the clock digits ensures that each digit position will be read and that the end digit position will be unequivocally identified. It is also advisable to use a card presence detector, which can be a switch similar to that shown, to detect the presence of a card in the slot 46. In this way, the electronic circuitry is alerted when a card is inserted, and it is cleared to a datum condition when the card is withdrawn. Both switches 63 should be operated simultaneously by the digits 23 and 24 which are adjacent to each other. In other words, each of the digit positions should be read at one time in both rows. Not shown in FIGS. 5–8 is the apparatus for embossing the sales slip 42 with the account number and other information contained on the card 45. This apparatus can be equipment presently known and used.

Referring again to FIG. 4, the amplifier 32 may be any standard amplifier which has the characteristics for the purpose. There is no need to describe such an amplifier in detail since there are many on the market.

A suitable differentiator 33 is shown in some detail in FIG. 9. The differentiator comprises an operational amplifier 91 having a pair of inputs. An input signal is applied to an input terminal 92 which is connected through a capacitor 93 and a resistor 94 to the negative input of the amplifier 91. The positive input of the amplifier 91 is grounded through a resistor 96. A feedback resistor 97 connects the output of the amplifier 91, which is the output terminal 95, to the negative input of the amplifier 91.

The series combination of the capacitor 93 and the resistor 94 serves as a differentiator for the signal applied to the terminal 92. In the differentiator of FIG. 9, $$R_0 = R_2 \qquad F_0 = 1/2\, R_1 C_1$$
$$E_0 = -R_0 C_1 (dE_1/dt) \qquad F_1 = 1/2\, R_0 C_1$$

where resistor 97 is $R_0$; capacitor 93 is $C_1$; resistor 96 is $R_2$; $E_1$ is the voltage out at the terminal 95; $F_0$ is the low frequency cutoff into terminal 92, $R_1$ is 94, and $F_1$ is the high frequency roll-off point. As the signature is being written on the line 44 of the sales slip 42, the voltage out at the terminal 57 of the system of FIG. 7 varies. This varying potential is $E_1$ which is applied to the amplifier 91. A portion of the output from the amplifier 91 is fed back through the resistor 97. Since the positive input of the amplifier 91 is connected to ground, the variations in the input potential produce variations at the output terminal 95 which change in accordance with the rate of change of the input signal. Therefore, at the points where the signature changes direction, the rate of change of the position of the scribe is at a minimum and these points are zero points. This is the first derivative of the input signal applied to the terminal 92.

Figure 10:
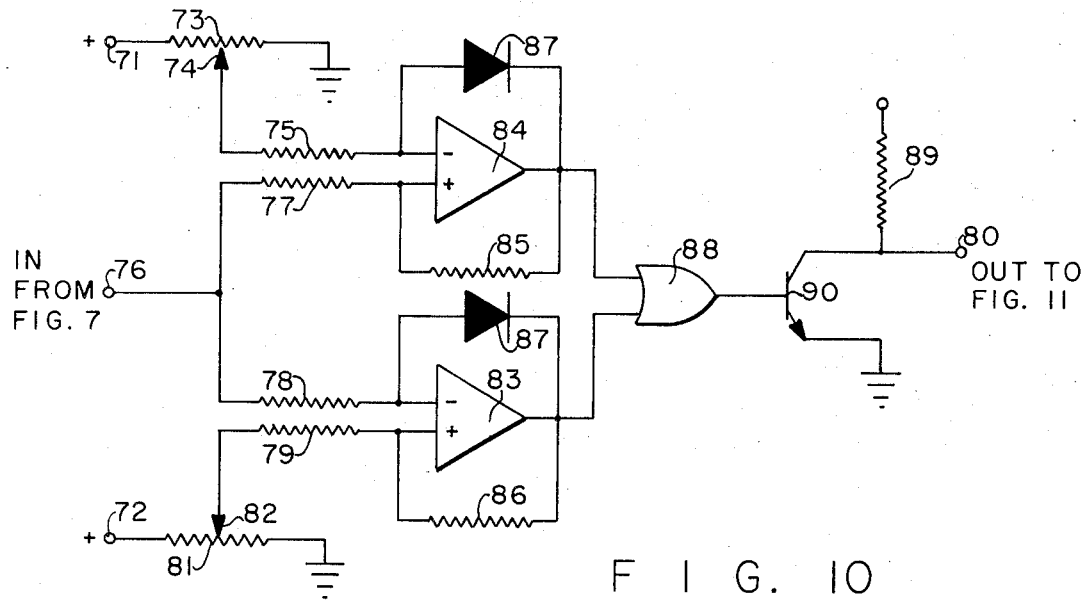
FIG. 10 is a schematic circuit diagram of a typical zero crossover detector used in the system of this invention.

The output from the terminal 95 of the differentiator, shown in FIG. 9, is applied to an input terminal 76 of a zero crossover detector shown in FIG. 10. The crossover detector 34 comprises a pair of differential amplifiers 83 and 84. The negative input of amplifier 84 is connected through an input resistor 75 to the slide contact 74 of the potentiometer 73. A voltage, applied to terminal 71, is connected to one side of the potentiometer 73, the other side of which is grounded. The positive input of amplifier 83 is connected through resistor 79 to the slide contact 82 of a potentiometer 81.

One side of the potentiometer 81 is connected to an input terminal 72 to which a source of electrical energy is applied, and the other side of the potentiometer 81 is grounded. The input terminal 76 is connected both to the positive input of the amplifier 84 through a resistor 77 and to the negative input of the amplifier 83 through a resistor 78. The amplifier 83 has a resistor 86 connected in a feedback path from the output of the amplifier 83 to its positive input, and the amplifier 84 has a resistor 85 connected in a feedback path from the output of the amplifier 84 to its positive input to provide a controlled hysteresis. Each amplifier has a diode 87 connected between its output and its negative input to prevent the negative input from going positive. The outputs of the amplifier 83 and 84 are applied as inputs to an OR gate 88 whose output is applied to the base electrode of a transistor 90. The collector electrode of the transistor 90 is directly connected to an output terminal 80 and is connected through a load resistor 89 to source of electrical potential. The emitter electrode is grounded.

In operation, the negative input of the amplifier 84 and the positive input of the amplifier 83 have applied to them fixed voltages selected by the settings of the slide contacts 74 and 82 on their respective potentiometers 73 and 81. The same input voltage from the differentiator 33 shown in FIG. 10 is applied to both the positive input of the amplifier 84 and the negative input of the amplifier 83. Thus, the input potential applied to the terminal 76 affects the two amplifiers 83 and 84 differently. So long as the input potential to the terminal 76 is closer to zero than either of the fixed potentials applied to the amplifier inputs, the amplifiers 83 and 84 are nonconductive. When, however, the input potential swings one way or the other in an amount greater than either of the applied potentials, one or the other of the amplifiers 83 and 84 conducts. When the input signal applied to the terminal 76 is more positive than the potential applied to the amplifier 84 by the potentiometer 73, that amplifier conducts; and when the signal at the terminal 76 is more negative than that from the potentiometer 81, the same is true of the amplifier 83. The conduction of either amplifier 83 or 84 applies a signal through the gate 88 to cause the transistor 90 to conduct through the load resistor 89. The resulting pulse is applied to the output terminal 80. As the input signal swings first in one direction and then in the other, each swing which is greater than the biasing potential causes the generation of a new pulse by the transistor 90. Thus, the swings of the signature are converted into pulses. Since the differentiation of the signature signal converted the signature peaks into zero potentials, each of the pulses represents one of those peaks.

Figure 11:
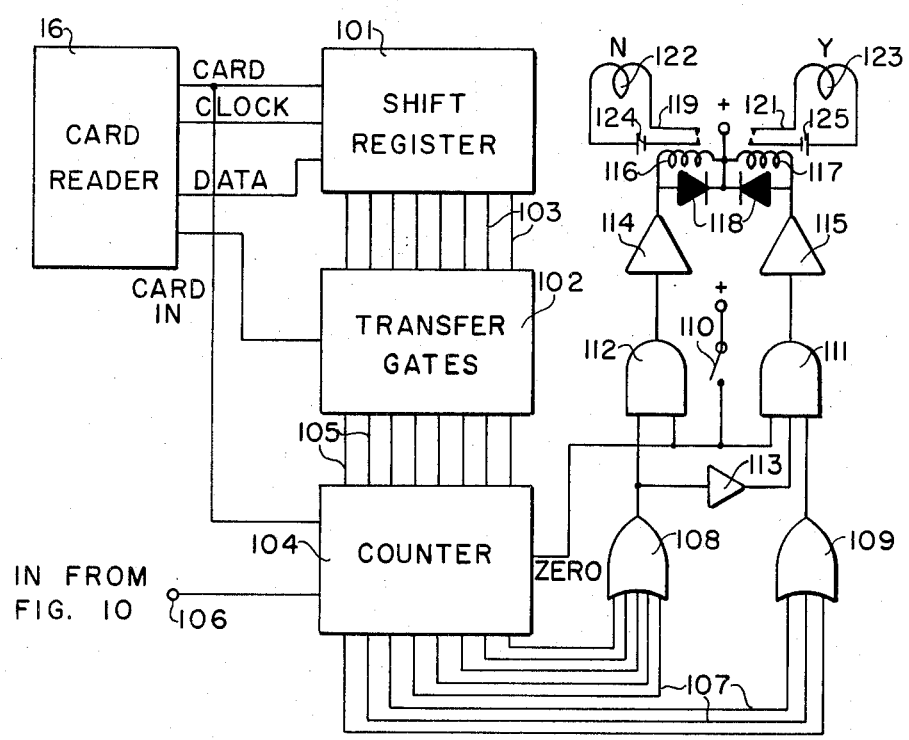
FIG. 11 is a block diagram of a comparator for comparing the card carried information with signature information as it can be used in the system of this information.

The output from the terminal 80 of FIG. 10 represents the pulse train of the signature as it is written in the field. In FIG. 11, this information is compared with the information read from the card 13 to produce the indication that the signature and card do or do not form a good combination. When the card 45 is inserted into the card reader slot 46, as shown in FIG. 8, the two rows of raised digits are read by switches such as 63. The outputs from the two switches comprise two trains of pulses. In addition, as mentioned above, a third switch is used to detect the presence of the card itself in the slot 46 and a fourth switch senses when the card has been fully inserted. This is represented in FIG. 11 by the card reader 16 having four output lines, three of which are connected to inputs of a shift register 101. For the example used in this specification, the register 101 has a capacity of eight digits, and it has eight output lines 103 which are connected to eight transfer gates, represented in the drawings as a block 102. Each of the eight transfer gates has an output 105 which is connected to the present input of a counter 104. In addition, the signal from the "card entered" switch is connected to the transfer gates, and the line carrying the card detection signal is connected to an input of the counter 104 and to shift register 101 to reset that register to zero. The output signal from the terminal 80 of FIG. 10 is applied to terminal 106 which is connected to the count input of the counter 104. The eight digit positions in the counter 104 are connected through two OR gates 108 and 109 with three of the eight output lines 107 being connected as inputs to the OR gate 109 and the other five lines 107 being connected as inputs to the OR gate 108. The output from the gate 108 is applied to one input of a coincidence gate 112, and as one input to a coincidence gate 111 through an inverter 113. The second input to gate 112 and another input to gate 111 is supplied from a manual switch 110. The output from the gate 109 is also applied as another input to gate 111. The output from the gate 112 is applied through an amplifier 114 to a coil 116 of a relay switch 119 which is connected in series between a source of electrical energy, represented here by a battery 124, and lamp 122. The output from the gate 111 is applied through an amplifier 115 to the coil 117 of a relay switch or solenoid 121 which is connected in series with a source of energy, represented here by the battery 125, and a lamp 123. Light emitting diodes 118 may be connected across the relay of solenoid coils 116 and 117 or they may replace the coils 116 and 117. The junction between the coils 116 and 117 and the junction between the two light emitting diodes 118 are connected together and to a source of positive potential. The switch 110 also is connected to the reset input of the counter 104 and has a voltage connected to it.

When the card 45 is inserted into the slot 46, the switches 63 read the raised portions of the card and produce pulse trains which are applied to the shift register 101. The output from the card presence detector conditions register 101 to receive information applied to it in serial form. The clock row 24 contains a raised digit in each of the digit positions, so that for each place that a data digit may appear, there is a clock pulse. By using a clock track on the card itself, the speed with which the card is inserted has no effect on the operation of the system. In addition, the first digit position read is positively identified even if it contains no digit. As the card is inserted, both the clock row 24 and the data row 23 are read at the same time. Each time the register 101 receives a clock pulse, it steps the contents of the register over one place. Each time a data pulse is applied to the register 101, it is stored therein. When the card has been read, the register 101 contains the data pulses in the same positions that they are recorded on the card 45. The information contained in the register 101 is continually transferred through the transfer gates 102 by the action of the card presence signal applied to the inputs of the gates 102. This is accomplished as the card 45 is being read, but when the card has been fully inserted, the "card entered" signal is applied to the clock input of the counter 104. This enters into the counter 104 the final contents of the shift register 101.

At this point a word must be said about the information recorded on the card or produced by reading the signature in the field. What is desired is that when the counter 104 contains the information read from the card 45, the additional information supplied by signing in the field should drive the counter just beyond its capacity and produce an output signal by overflowing to zero. This can be achieved in any of several ways. As an added precaution to prevent the abuse of the cards, the actual number derived for the signature initially can be weighted. That is, the information recorded on the card 45 can be the sum of the signature count and an arbitrarily selected number.

Signatures vary daily in many ways. For example, signature slants vary from forward, to vertical, to backward according to the mood of the signer at the time. Signatures also vary in height as well as in skipped and missing letters, particularly when hastily signed. To compensate for missing and extraneous max/min or inflection points, some hysteresis must be incorporated in the system. FIG. 11 shows a hysteresis (or tolerance) of three binary digits as applied to OR gate 109. Gate 109 will recognize any count from zero to seven. OR gate 108 will recognize any number between eight and 255. When the system is interrogated by the operation of switch 110, a legal signature will be recognized when a count of between one and seven is produced. An illegal signature is identified by a count between eight and 225. To accomplish this, the card 45 will carry the complement of the signature count (plus the weighting factor) so that when the card count and the signature count are accumulated in the counter 104, the total must produce an overflow to a value of between zero and seven to be valid. This is equivalent to a tolerance of +4 and −3 around an optimum signature total of three. Assume, for this discussion, that the complement of the actual signature count is recorded on the card and that the card also contains in the three least significant positions, the arbitrary weighting information. What is read from the card is transferred to the counter 104. When the signature is being written in the field, the pulse train output from the crossover detector of FIG. 10 is fed into the input terminal 106 and to the counter 104. As the signature is written, the pulses generated thereby are counted by the counter 104. When the signature is completed, the counter 104 should have generated an overflow. The contents of the five most significant positions are then applied to the OR gate 108, and the output of gate 108 is applied to the AND gate 112. A second input to the gate 112 comes through an inverter 113 from the output of the OR gate 109 which receives the contents of the three least significant positions of the counter 104. The third input to the gate 112 is from the switch 110 which is momentarily depressed by the operator when the slip has been signed. Should all three inputs be present on the gate 112, it passes an output and energizes the coil 116 to close the switch 119 or light the lamp 122. Depression of the switch 110 also applies a signal to the clear input of the counter 104 to clear the counter to zero. When the counter 104 reaches a final count between one and seven the five most significant output lines carry zeros and at least one of the three least significant output lines carries a one. Thus, the gate 108 has only zeros applied to it whereas the gate 109 has at least one one.

The gate 111 has an input signal applied to it by the output from the gate 109 and another from the inverter 113, and when the switch 110 is closed, the third input is applied to the gate 111, which opens and passes a signal to the coil 115 to light the YES lamp 123. Should, however, the counter 104 reach a final value other than between one and seven, the gate 108 will pass a pulse to the gate 112 and through the inverter 113, to the gate 111. The gate 111 is inhibited by the low output of the inverter 113 even though it may receive input signals from the gate 109 and the switch 110. Thus, when the gate 108 has an input signal applied to it, gate 112 is opened to light the NO lamp, and gate 111 remains closed to prevent the lighting of the YES lamp. When the switch 110 is closed, it not only applies a signal to the gates 111 and 112, but it also clears the counter 104 to prevent a customer from writing in steps and closing the switch to see when he finally gets a good combination.

There are many other ways in which the information on the card can be coded to prevent simple discovery of how to fool the machine. The counter 104 can be loaded with the complement of the arbitrary number added to the card. In that case, the entire counter may be used and none of the digit positions ignored. The information, at any time, can be recorded in only some of the positions, and these positions can be changed whenever the cards are reissued. The number of different ways to encode the cards and the counter is limited only by a limited imagination. In addition, upwardly counting counters 104 can be used, or downwardly counting counters can be used. The inputs to the gate 108 can be arranged so that a prescribed number must be reached rather than full capacity. And each year when new cards are issued, the coding can be changed.

Figure 12:
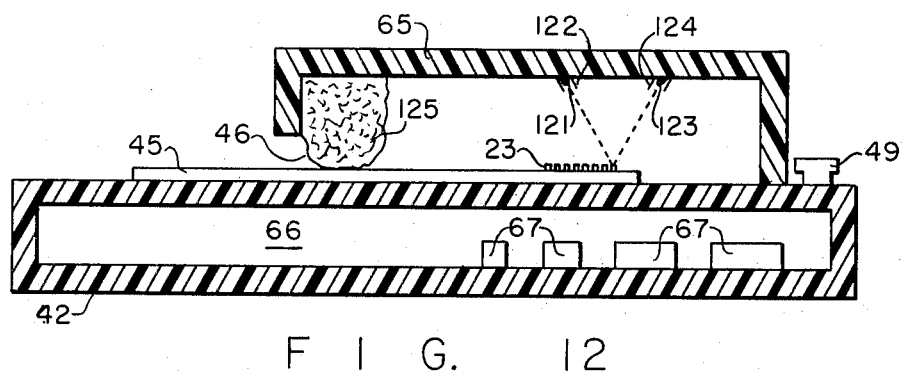
FIG. 12 is a sectional view of another form of card reader which may be used in the system of this invention.

The above has described one form that the entire card reader and signature verifier can take. The following description will go on to describe some variations on the theme. For example, FIG. 12 illustrates a card reader which includes the housing 65 having a slot 46 into which the card 45 is inserted. The reader itself is contained on a base 42 which can be hollow as described above to contain the electronic components 67. Within the housing 65 is a source of light 121 having a shield 122 and a photoresponsive device 123 within its shield 124. A sponge 125, or other porous mass, is mounted within the housing 64 adjacent the opening 46.

In the embodiment shown in FIG. 12, the card 45 is read photoelectrically. As the card 45 is inserted into the slot 46, the sponge 125, which is impregnated with a cleansing compound, wipes clean the raised digits 23. As the digits 23 move toward the right, they pass beneath the beam from the light 121 and reflect that light upwardly to the photoelectric device 123. Since the spaces between the digits 23 do not reflect light back to the device 123, the output from the device 123 is a series of pulses. To avoid the light from the lamp 121 falling upon the photoresponsive device 123 when no card is in the slot 46, each is surrounded by its own shield. The card 45 may be coated with a highly reflective layer, if desired, to increase the accuracy with which the unit responds.

Figure 13:
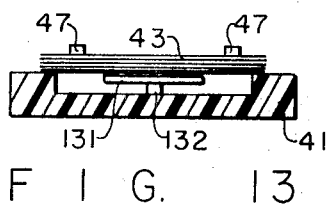

Another form of the signature encoder is shown in FIG. 13. This is a simple device and is simply shown. Within the base 41, a piezoelectric crystal 131 is supported on a post 132. The crystal 131 is supported immediately beneath the portion of base over which the signature is written. FIG. 13 merely shows the sales slips 43 immediately above the crystal 131, but it may be desirable to cover the opening in which the crystal sits with a membrane or flexible cover. The crystal is one which is cut to generate an electrical signal when it is flexed in at least one direction, although, as discussed later, so called "stereo" crystals can also be used.

When the signature is written by the person presenting the card 45, the crystal 131 is flexed by the pressure of the writing instrument. As the crystal 131 flexes, it generates an electrical signal. As the crystal 131 bends on one side of the post 132, the output potential from the crystal has one polarity, and as the crystal bends on the other side of the post 132, it generates a voltage of the opposite polarity. Thus, the output from the crystal 131 is an alternating signal which follows the signature being written. Or, the crystal can be mounted directly on the base 41 with an arm, similar to a phonograph needle, which is deflected by writing on the sales slips 42.

Figure 14:
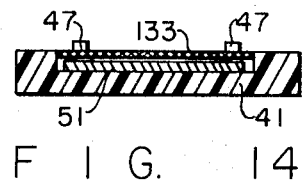

Another manner in which the signature being written can be converted into an equivalent electrical signal is shown in FIG. 14. In this case, the structure is similar to that of FIG. 6. In FIG. 14, the base 41 has a depression therein which contains a highly conductive surface 51. Covering the top of the depression in the base 41 is a flexible membrane 133 which has a fixed and determinable electrical resistance. Although not shown in FIG. 14, the sales slips 43 are placed on the posts 47 above the membrane 133. As the signature is written, the membrane 133 is depressed against the conductive surface 51 which changes the electrical resistance of series electrical circuit as shown in FIG. 7. In this case, however, the resistive membrane is built into the base 41, not into the sales slip 43.

Figure 15:
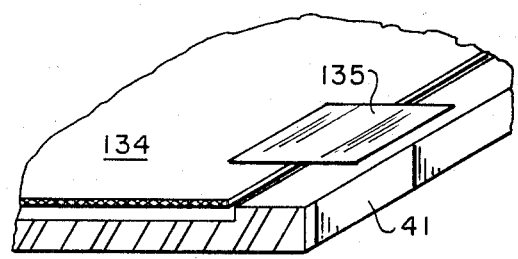

In addition, if a membrane with a fixed resistance suitable for this purpose is not readily available, as shown in FIG. 15 a flexible membrane 134 may be mounted over the depression in the base 41 by means of strain gages 135. In this figure, only one strain gage is shown, but it is to be understood that another strain gage 135 is to be used at the other end of the membrane 134. In this case, the base 41 does not contain a conductive surface 51. When the signature is being written, the membrane 134 is stretched as it deflects downwardly into the depression in the base 41. This stretches the strain gages 135, the gage nearest to the writing instrument being stretched the most. The strain gages 135 can be connected into a normal strain gage bridge to produce an electrical signal output which varies as the signature is being written.

It was mentioned above that the crystal 131 of FIG. 13 can be a "stereo" crystal. That is a crystal which produces two different output signals when flexed in two directions at right angles to each other. Similarly, instead of two strain gages 135 being used in the apparatus of FIG. 13 at opposite ends of the membrane 134, the strain gages 135 can be mounted at edges of the membrane 134 which are adjacent to each other. In the apparatus described above, the derivative of the signature variation in the Y-direction in the plane of the sales slip 42 was obtained with respect to time—the time it takes to write the signature. This is because the only variation being sensed was in the Y-direction, and that sensing was with respect to time. However, if a stereo crystal is used in the apparatus of FIG. 13, or if strain gages 135 are used in the apparatus of FIG. 15 at right angles to each other, the electrical signals generated will be the derivative of changes in Y with respect to X rather than with respect to time. The signal is used in the same manner as is the signal earlier described, but this presents another variation in the derivation of the electrical signal which can be used to discourage attempts to deceive the apparatus.

Figure 16:
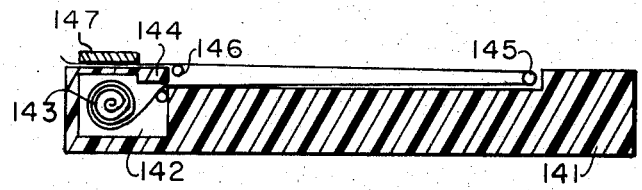

In FIG. 16, there is shown a signature encoder which uses a roll of electrically resistive material 143. The base 141 has a depression formed therein under the portion of the sales slip which is signed. In a hollow portion 142 of the base 141 is stored a roll of material 143 which has a fixed and determinable electrical resistance per unit area. The material 143 passes over a roller 144 mounted at the exit slot from the hollow portion 142, over another roller 145, across the depression in the base 141, over a roller 146, and under a cutoff sheet 147. The rollers 144, 145, and 146 are mounted for easy rotation in the base 141 in any suitable manner, and the cutoff sheet is but a piece of material attached to the top surface of the base 141 so that the material 143 passes freely thereunder.

The sales slips are placed on the base 141, as explained above, with the place for receiving the signature over the depression in the base. When the signature is being written, the sales slips press down onto the top sheet of the material 143, causing it to press against the lower sheet of the same material. In this case, although not shown to preserve simplicity of drawings, a source of electrical energy is connected across any two of the rollers 144, 145, or 146. If the source is connected across the rollers 145 and 146, then the lower sheet of the material 143 serves in the same manner as the conductive surface 51 does in FIG. 6—as a conductor which changes the total resistance in the circuit. If the source is connected across rollers 144 and 146, then the action is similar, but the amount of resistance change is substantially doubled, since current is flowing through both the upper and lower sheets of the material 143 in series. If the source is connected across the rollers 144 and 145, the upper sheet serves as the conductive surface and varies the amount of resistance the lower sheet places in the circuit. How the connections are made is a matter of individual design. If desired, a highly conductive surface can also be used in lieu of one of the sheets of the material 143. After a signature has been signed, the used portion of the material 143 can be pulled out and torn off against the edge of the cutoff sheet 147. In this way a clean portion is presented for each signature, tending to assure proper operation of the equipment. One of the rollers, preferably roller 145, should be resiliently urged toward its end position to maintain the material 143 taut. This may be readily accomplished by urging to the right the bearings in which the ends of the roller 145 turn by means of springs. The supply roll upon which the material 143 is wrapped may also be spring biased in a manner similar to the ordinary windowshade.

Two alternative circuits for reading the results of the counter output are shown in FIGS. 17 and 18. In FIG. 17, the counter 104 is shown with the lines 105 which connect it to the output of the transfer gates 102 and the input terminal 106 from which it receives the output pulses from the differentiator of FIG. 10. The capacity of the counter 104 comprises eight binary digits which are represented by the eight output lines. Three of the output lines from the counter 104 are connected as inputs to a coincidence gate 152 and the other five output lines from the counter 104 are connected as inputs to the coincidence gate 151. The output from the gate 151 is applied as an input to a coincidence gate 112, and the output from the gate 152 is applied as a direct input to a coincidence gate 111 and through an inverter 113 as another input to the gate 112. The third input to the gate 112 and the second input to the gate 111 comes from the zeroing input of the counter 140 from the switch 110. The output of the gates 111 and 112 are connected as they are shown in FIG. 11, and these connections are not shown in FIG. 17.

As mentioned above, one additional safeguard for this identification system is the use of a weighting number which is arbitarily added to the signature amount. One way in which this can be achieved is to provide the first two or three, or the last two or three digit positions with the arbitrary number. The remainder of the digits would then represent the actual signature count. For this discussion, assume that the first three digits (the three most significant digits) contain the arbitrary number. Assume, for this discussion, that the complement of the actual signature count is recorded on the card 45, and that the card 45 also contains in the three most significant positions the arbitrary information. What is read from the card is transferred to the counter 104 in the same manner as discussed above in connection with the description of FIG. 11. As the signature is now written, the pulses generated thereby are applied to the terminal 106 and are counted by the counter 104. When the signature is completed, the counter 104 should be completely filled (again ignoring the three most significant positions). If the counter 104 contains all ones in its five least significant positions, as it should; then the gate 151 is opened. However, the three most significant positions of the counter 104 would not contain all ones, since the arbitrary number inserted therein at the beginning is selected to contain at least one zero. Therefore, the gate 11 is not opened. When the test switch 110 is depressed to zero the counter 104, it also applies a signal to the input of the gates 111 and 112. Since the output of the gate 152 is zero, its inverted output applied to the gate 112 is a one, and the gate 112 has three ones applied to it and opens. As discussed above, when the gate 112 opens, the YES light is lit, indicating a good signature and card.

Another preferred manner of reading the output from the counter 104 is shown in FIG. 18 in which the counter 104 is shown with six of its eight output lines applied to the inputs of a NOR gate 154. The output of the NOR gate 154 is applied to the relay coil 117 directly, and through an inverter to a relay coil 116 as described above in connection with FIG. 11. The remaining two output lines are not used. In the device of FIG. 18, which is the simplest system of all, two output lines of the counter 104 are shown not used. These lines represent the arbitrary number which is added to the signature count and stored in the counter 104. When the number read from the card is stored in the counter 104, and the signature count is completed with the pulses being applied to the counter through the input terminal 106, the counter 104 in its six most significant digit positions should contain all ones. The ones are applied to the inputs of the gate 154 through separate inverters 153 so that the inputs to the gate 154 are all zeros. When all of the inputs to the gate 154 are low, the output is high, and the relay coil 117 is activated to light the YES lamp. Should any number signature count but the correct one be applied to the terminal 106, the contents of the counter 104 would not reach all ones, at least one of the output lines connected to the gate 154 would be low, and this would apply a high signal to a gate input. The output of the gate 154 would then be low, the output of the inverter 155 would be high, and the relay coil 116 would be energized to light the NO lamp. If the two or three least significant digits be connected to the gate 152 in FIG. 17 or not used in FIG. 18, then these two or three digit position serve as the tolerance counts which permit some leeway in the manner the signature is signed.

All of the preceeding description has been predicated upon the initial ability to analyze a signature and obtain a signature count which is recorded on the card 13. This initial signature count can be obtained "manually"; that is, by someone counting the number of peaks, but that method is expensive and not necessarily accurate. Another manner in which the initial signature count can be achieved is by having someone trace the original signature using the apparatus shown in FIG. 5, for example. Again, this would be an expensive method, and since the person who signs the signature is not writing it, there is always the possibility of errors. FIG. 19 shows one form of apparatus which can be used by the applicant to provide the initial signature count in the field and also serve as a remote station. The apparatus of FIG. 19 is very similar to that of FIG. 5, and it comprises a casing 41 which has mounted upon it at its top end a housing 65 into which a card 13 can be inserted. The housing 65 may be the same as the housings shown in FIGS. 8 and 12 and may operate the same. Also included on the housing 41 are the YES and NO lamps 48 and 49. A pair of posts 47 at each end of the sales slip portion of the housing may be included to hold the sales slip 42 in place while being signed. However, the sales slip 42 may be held in place by any convenient means such as clamps, a cover, or similar devices. A pair of conductive strips 161 and 163 are provided in recesses in the top of the housing 41. The two strips 161 and 163 are located adjacent the ends of the sales slips 42 to provide electrical connections therewith. A source of electrical energy such as a battery 169 is connected between the two strips 161 and 163. Located on the top of the housing 41 between the two strips 161 and 163 is another strip 162 of conductive material, located so that it lies beneath the portion of the sales slip upon which the signature is written. Also mounted on the top of the housing 41 in any convenient location, shown in FIG. 19 between the strips 161 and 162, are a series of eight small conductive elements 164 and a ninth element 165. Each of the elements 164 is connected to an output of the counter 104 through appropriate amplifiers and gates broadly represented at 166. The counter 104 also is connected to the normal reading circuits discussed above. In connection with the apparatus of FIG. 19, the cover of FIG. 20 should also be considered. This cover 171 may be formed of any suitable material such as a synthetic resin, and comprises a hinge 172 at one end. The hinge 172 is also adapted to be mounted on the top of the housing 41 just above the posts 47. The cover 171 includes openings 173 through which the posts 47 may pass, an opening 174 through which the signature may be signed, and at least another opening 175 to expose that portion of the sales slip 42 upon which the purchases are itemized.

In operation, a sales slip 42 is placed in position on the housing 42 with the posts 47 passing through suitable holes in the sales slip assembly. The cover 171 is then lowered into position so that only portions of the sales slip 42 are exposed through the openings such as 174 and 175. The cover 171 also serves to press the botton sheet of the sales slip assembly firmly onto the conductive strips and elements 161–165 so that good electrical contact is maintained. The card 13 is then inserted into the housing 65 and the number read therefrom is entered into the counter 104 as discussed above. When the purchaser signs his name on the line 42, the signature count is obtained as described above, and the appropriate lamp 48 or 49 is lit. At the same time, when the test or read switch 110 shown in FIG. 11 is depressed, it not only reads and clears the counter 104, but it also applies a signal to the gates 166 to open those gates. This causes the contents of the counter 104 to be applied to the conductive elements 164 and 165. The current flowing through the conductive elements 164 and 165 is of sufficient amplitude to burn the bottom sheet of the sales slip assembly. Thus, the count in the counter 104 at the time that the switch 110 is closed is burned into the bottom sheet of the assembly. In normal use, the bottom sheet is discarded, so the operation of the conductive elements 164 and 165 is of little value then. However, when an applicant initially makes application for a card 13, he is presented with the application in place on the housing 41 with the place for the applicant's signature immediately over the conductive strip 162. Since no card 13 is available to be read, the contents of the counter are zero, the counter 104 having been cleared by the last reading. As the applicant signs his name on the application, the signature is analyzed as described above, and the signature count is entered into the counter 104 at the terminal 106. When the signature is completed and the attendant closes the switch 110, the contents of the counter 104 are applied to the corresponding conductive elements 164 to burn the back of the application. In order to provide an indication of where the number being burned into the application begins, the element 165 is energized whenever the counter 104 is read and always appears as the first digit. When the application is withdrawn from the housing 41, it has burned into it, the representation of the signature count. This may be used when the application is processed to supply the signature count information for the card 13.

The application may be formed of several layers of paper as is the sales slip assembly, or the single sheet of paper may be suitably treated with a chemical which changes color upon the application of an electrical current thereto. It is contemplated that applications for cards 13 will be displayed and be available wherever a card station is located. The application may be signed either before the questions are answered; or, preferably, for security reasons, the questions on the application may be answered first and then the application returned to a reading station for signing at the convenience of the applicant. For those applicants who prefer to apply by mail, the signature may be traced over using the apparatus of FIG. 19 to accomplish the same result.

The above specification has described many aspects of this invention, but no description has yet been given of the use of the card and apparatus of this invention for identification purposes other than that for credit cards. For example, reading stations may be incorporated into doorways in secure locations. In such an installation a card reader of the type shown in FIG. 5 may be incorporated into a permanent installation which includes a lock. Rather than signal lights 48 and 49, the output signal from the reader may be used to control the lock—to prevent its operation if the wrong signature is written or to condition the lock to be opened by its normal operator (key, combination, magnetic code, etc.) if the signature and card combination are correct. Thus, bedore the door can be opened, a card such as the card 13 must be inserted into the slot, then a name, word, or phrase of the day must be written, and then the lock must be opened. Such an entrance security system is difficult to defeat, particularly since the card, code, and written material may readily be changed daily.

The above specification has described a new and improved identification and security system which includes the combination of information previously recorded on a card, token, check, etc., and the writing at the time of the identification of a selected word or combination of words. It is realized that the above description may indicate to others in the art additional ways in which the principles of this invention may be used without departing from its spirit. It is, therefore, intended that this invention be limited only by the scope of the appended claims.

What is claimed is:

1. Apparatus for verifying the combination of a record member and the person presenting it, said apparatus comprising:
   a. a surface on which a person may write using an ordinary writing instrument such as a pen or pencil;
   b. first means for deriving a first digital signal representative of the physical displacements of a writing instrument in the plane of the writing as a person initially writes a repeatable combination of characters;
   c. means for applying indicia representative of said first digital signal to said record member;
   d. means for generating an analog signal representative of the physical displacements of said writing instrument in the plane of the surface as a person subsequently writes the same combination of characters;
   e. first means for deriving from said analog signal a second digital signal representing the number of changes in the direction of said writing instrument;
   f. means for reading said indicia from said record number and for reconverting it into said first digital signal; and
   g. means for comparing said first and second digital signals whereby verification may be had upon their correspondence.

2. The apparatus defined in claim 1 wherein said means for deriving a second digital signal comprises means for generating a pulse for each change in direction of said instrument.

3. The apparatus defined in claim 2 wherein said means for generating comprises a circuit formed of a sheet of material having a prescribed electrical resistance, an electrically conductive element situated beneath said sheet and separated therefrom, and means for applying an electrical potential between said element and said sheet so that the resistance in the circuit varies as the movements in the plane of said member of said instrument forces different portions of said sheet in contact with said element.

4. The apparatus defined in claim 2 further comprising a base and means for supporting said surface upon said base, said support means comprising said generating means and including at least one strain gage, and means for applying a source of electrical energy to said strain gage so that as said instrument traverses said surface the strain gage changes the amount of current flowing from said source.

5. The apparatus defined in claim 2 wherein said generating means includes a piezoelectric element, and means for attaching said piezoelectric element to said surface so that as said surface is traversed by said instrument the piezoelectric element is deflected to generate an electrical voltage.

6. The apparatus defined in claim 2 wherein said reading means includes means for sensing raised portions of said token and means for generating an electrical pulse for each raised portion sensed, and means for guiding said token past said sensing means.

7. The apparatus defined in claim 2 wherein said reading means includes means for sensing sharp changes in radiant energy from said token.

8. The apparatus defined in claim 2 further including recording means, means for supporting a record acceptor adjacent to said recording means, and means for connecting said recording means to said comparator so that the contents of said comparator may be recorded upon said record acceptor.

9. Apparatus for verifying a writing in realtime, said apparatus comprising a flat surface adapted to be written upon with an ordinary writing instrument, said apparatus including:
 a. means for generating first digital data representative of the changes in the direction of movement of a writing instrument when a person initially writes a selected expression.
 b. means for applying said first digital data to a token to be recorded thereon,
 c. means for generating an electrical waveform which represents changes in the direction of movement of said instrument in the plane of said surface when said person subsequently writes said selected expression,
 d. means in said apparatus for converting said waveform into a train of electrical pulses,
 e. means for reading from said token said first digital data and for converting said digital data into a second train of pulses, and
 f. comparator means for comparing said trains of pulses for correspondence.

* * * * *